United States Patent [19]
Mizutani et al.

[11] Patent Number: 5,893,646
[45] Date of Patent: Apr. 13, 1999

[54] BALL SPLINE

[75] Inventors: Haruo Mizutani; Naoki Koshino, both of Mino, Japan

[73] Assignee: Nippon Thompson Co., Ltd., Tokyo, Japan

[21] Appl. No.: 09/002,093

[22] Filed: Dec. 31, 1997

[30] Foreign Application Priority Data

Feb. 6, 1997 [JP] Japan .................................. 9-036932

[51] Int. Cl.$^6$ ...................................................... F16C 29/06
[52] U.S. Cl. ................................................................ 384/43
[58] Field of Search ............................... 384/43, 44, 45; 464/168

[56] References Cited

FOREIGN PATENT DOCUMENTS

| | | |
|---|---|---|
| 59-187112 | 10/1984 | Japan . |
| 7-208469 | 8/1995 | Japan . |
| 2504812 | 4/1996 | Japan . |

*Primary Examiner*—Lenard A. Footland
*Attorney, Agent, or Firm*—Browdy and Neimark

[57] ABSTRACT

The present invention provides a ball spline which enables the manufacturing of an outer cylinder to be done simply, the manufacturing cost to be reduced, and the loading of balls to be done easily. This ball spline comprises a slider fitted around a ball spline shaft so that the slider can be slid freely thereon, and so that rotational torque can be transmitted to the slider. In the slider, a retainer unit fitted in the outer cylinder is divided into two at the regions of direction changing passages, and rings provided with curved portions constituting guides for balls are fitted in the portions of the outer cylinder which are opposed to the regions of the direction changing passages. The rings are fitted between the outer cylinder and retainers.

14 Claims, 12 Drawing Sheets

BALL SPLINE

BACKGROUND OF THE INVENTION

1. Field of the Invention

This invention relates to a ball spline in which a slider is formed so that the slider can be slid via balls relatively to a ball spline shaft having longitudinally extending raceway grooves.

2. Description of the Prior Art

A ball spline adapted to moving a slider linearly along a ball spline shaft via balls held and rolling in retainers has been applied to an industrial robot and a transfer machine. A ball spline constitutes a linear motion guide bearing, and comprises an elongated ball spline shaft, and a slider freely slidable with respect to the ball spline shaft and adapted to receive rotary torque from the same.

A linear motion guide ball bearing is known as a retainer-carrying ball spline. This linear motion guide ball bearing comprises mainly an outer cylinder, retainers, balls as rolling elements, and snap rings. On the outer circumferential side of the retainers, circuit type circulating passages for circulating and guiding the balls are formed. An inner circumferential surface of the outer cylinder is provided with raceways on which the balls receiving a load roll, inclined surfaces for circulating the balls smoothly from the raceways to no-load escape sections, and ball return passage-forming circumferentially inclined curved surfaces (refer to, for example, Japanese Patent Laid-Open No. 187112/1984).

A ball retainer for linear bearings, comprising a retainer body, and an annuler member adjacent to the retainer body is known as a ball spline. This ball retainer for linear bearings is formed of a retainer body and an annular piece, the retainer body being provided with loaded ball guide grooves in ball rolling regions of raceways, the annular piece being provided with semicircular recesses, which are opposed to ball turning grooves formed at an end portion of the retainer body, for smoothly carrying out the circulating and guiding of the balls (refer to, for example, Japanese Utility Model Registration No. 2504812).

The ball spline disclosed in Japanese Patent Laid-Open No. 208469/1995 filed by the applicant of the present invention has a one-piece retainer fitted in an outer cylinder body and side rings, and end seals at both ends of the retainer. This ball spline need not be provided with ball retaining claws in the outer cylinder body, and the retainer can be positioned accurately in the axial and circumferential directions with respect to the outer cylinder body. The ball spline is provided with an axial slide stop and a rotation stop on the retainer. When the retainer turned during the assembling of the ball spline, until the axial slide stop has been brought into slide contact with both of the end surfaces of the outer cylinder body with the rotation stop having contacted a rotation stop surface of the outer cylinder body, the axial and circumferential positioning of the retainer with respect to the outer cylinder is attained. When the projections of the side rings are fitted in hollow spaces between outer surfaces of projecting portions of this ball spline and wall surfaces of recessed portions of the outer cylinder body, the retainer can be fixed with respect to the outer cylinder body.

In various types of ball splines described above, escape sections comprising inclined grooves are formed at both of axial ends of raceway grooves in ball loading regions of the outer cylinder so as to guide the balls moving in direction changing passages in the retainer. Therefore, it is difficult to form the raceway grooves, and the manufacturing cost increases. Regarding the outer cylinder, to which a retainer is fixed, in a conventional ball spline, the broaching thereof and the high-precision finishing of the raceway grooves thus formed in the outer cylinder are difficult to implement, and it is also troublesome to form retainer fixing portions on the outer cylinder. This causes the outer cylinder manufacturing cost to increase.

SUMMARY OF THE INVENTION

An object of the present invention is to solve these problems, and provide a compactly formed ball spline by dividing a retainer into two at regions in which direction changing passages are formed; enabling the insertion of balls, which constitute rolling elements, to be carried out easily; and forming boundary regions of the direction charging passages as independent rings separated from the outer cylinder, without forming inclined surfaces as ball guides on the outer cylinder, so as to enable the rings to be provided easily with curved recesses as guides for the balls, the balls in the boundary regions of the direction changing passages to be guided smoothly owing to a cooperation of the rings and retainers, the assembling and positioning of the outer cylinder, rings retainers and end plates to be done easily, the manufacturing of the outer cylinder to be thereby done easily with an improved precision, the manufacturing cost to decrease, and the slider-forming parts to be housed in the outer cylinder.

This invention relates to a ball spline comprising a ball spline shaft provided with a pair of first raceway grooves in longitudinally extending outer surface thereof, and a slider fitted around the ball spline shaft so that the slider can be slid freely on the ball spline shaft, and so that rotary torque can be transmitted to the slider, the slider comprising an outer cylinder provided with second raceway grooves longitudinally extending so as to be opposed to the first raceway grooves, a first retainer fitted in the outer cylinder and provided with windows opposed to the first raceway grooves in the ball spline shaft, and return grooves extending along the windows, a second retainer contacting the first retainer and fitted in the outer cylinder, balls rolling in raceways, which are formed by the first and second raceway grooves, through the windows, rings fitted between the outer cylinder and the first and second retainers so as to form guides for changing the direction of rolling of the balls, end plates fitted in the outer cylinder and disposed adjacently to the rings, and stop rings fitted in annular grooves, which are formed in the outer cylinder, so as to fix the first and second retainers, rings and end plates.

The windows formed in the first retainer are elongated holes positioned correspondingly to the raceways. The balls roll in a loaded state in the raceways, which are formed between the first raceway grooves in the ball spline shaft and the second raceway grooves in the outer cylinder, as the balls are supported on longitudinal edge portions of the elongated holes.

The outer cylinder is provided with escape grooves forming outer walls of the ball return passages, the return grooves in the first retainer being formed so as to be opposed to the escape grooves and forming inner walls of the return passages.

The outer cylinder is provided with a first hollow holding the first retainer therein and having the escape grooves, and second hollows having a diameter larger than that of the first hollow so as to form stepped portions around and with which the rings are disposed and engaged.

The first retainer is provided at one end thereof with first direction changing grooves forming the first direction changing passages permitting communication between the windows and return grooves, and at the other end thereof with parts of second direction changing grooves forming the second direction changing passages allowing communication between the windows and return grooves, the second retainer being provided with remaining portions of the second direction changing grooves forming the second direction changing passages allowing communication between the windows and return grooves. The rings are provided with curved recesses forming outer walls of the direction changing passages.

The return grooves and windows formed in the first retainer extend in parallel in the longitudinal direction thereof, and the first and second direction changing passages are formed curvilinearly so as to allow communication between the return grooves and windows.

The balls roll circulatingly in the raceways forming load regions, and the first and second direction changing passages and return passages which constitute no-load regions.

The windows in the first retainer are provided at both ends thereof with first inwardly extending curved projections, and the second retainer is provided at the portions thereof which are opposed to the first raceway grooves with second inwardly extending curved projections, the first and second projections forming ball rolling guides between the windows and direction changing passages.

The outer cylinder is provided with threaded holes for use in fixing an object to be mounted thereon to the outer cylinder.

The contact surfaces of the first and second retainers are provided with first mutually engageable positioning means. The fitting surfaces of the first retainer and rings are provided with second mutually engageable positioning means. The rings and end plates are provided with third mutually engageable positioning means.

The end plates comprise metal cores, and dust-proofing seal members fixed to the metal cores and slidably contacting the ball spline shaft.

The rings and first and second retainers are formed out of a metal or a synthetic resin material.

This ball spline is formed as described above, in which the rings provided with curved recesses forming parts of the direction changing passages in which the balls roll are fitted in the hollows forming the stepped portions of the outer cylinder. This enables the forming of the escape grooves, raceway grooves and hollows in the inner circumferential surface of the outer cylinder to be done very easily, and the manufacturing cost to be reduced.

In the ball spline according to the present invention described above, rings formed separately from the outer cylinder is provided, and fitted in the outer cylinder to form recesses. Therefore, the outer cylinder need not be provided with such ball guiding inclined surfaces as are provided on a conventional outer cylinder. Accordingly, the outer cylinder can be formed very easily, and the manufacturing cost can be reduced.

The retainer unit comprises two members, i.e. first and second retainers separated at the direction changing passages. Therefore, the assembling of the slider can be completed by inserting balls in order in the circuit type endless circulating passages formed between the first retainer and outer cylinder, and then fixing the second retainer to the first retainer. Thus, the incorporating of the balls into the slider can be done very easily and reliably.

Especially, all constituent parts of the slider including the first and second retainers, a pair of rings and a pair of end plates are fixed to an inner portion of the outer cylinder by a pair of stop rings, so that the slider as a whole is formed compactly, and handled excellently.

DETAILED DESCRIPTION OF THE EMBODIMENT

Figure 1:
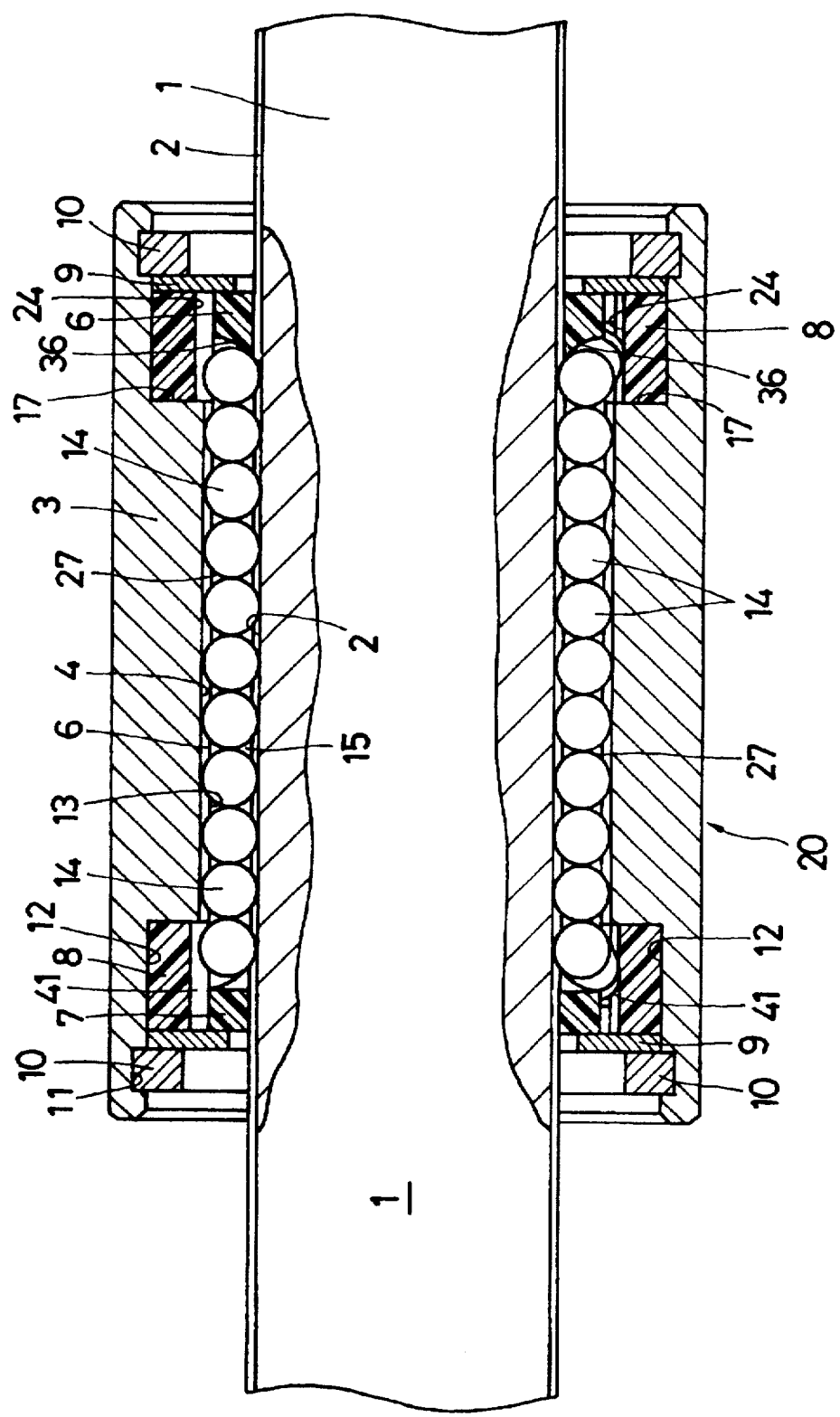
FIG. 1 is a sectional view showing an embodiment of the ball spline according to the present invention.
Figure 2:
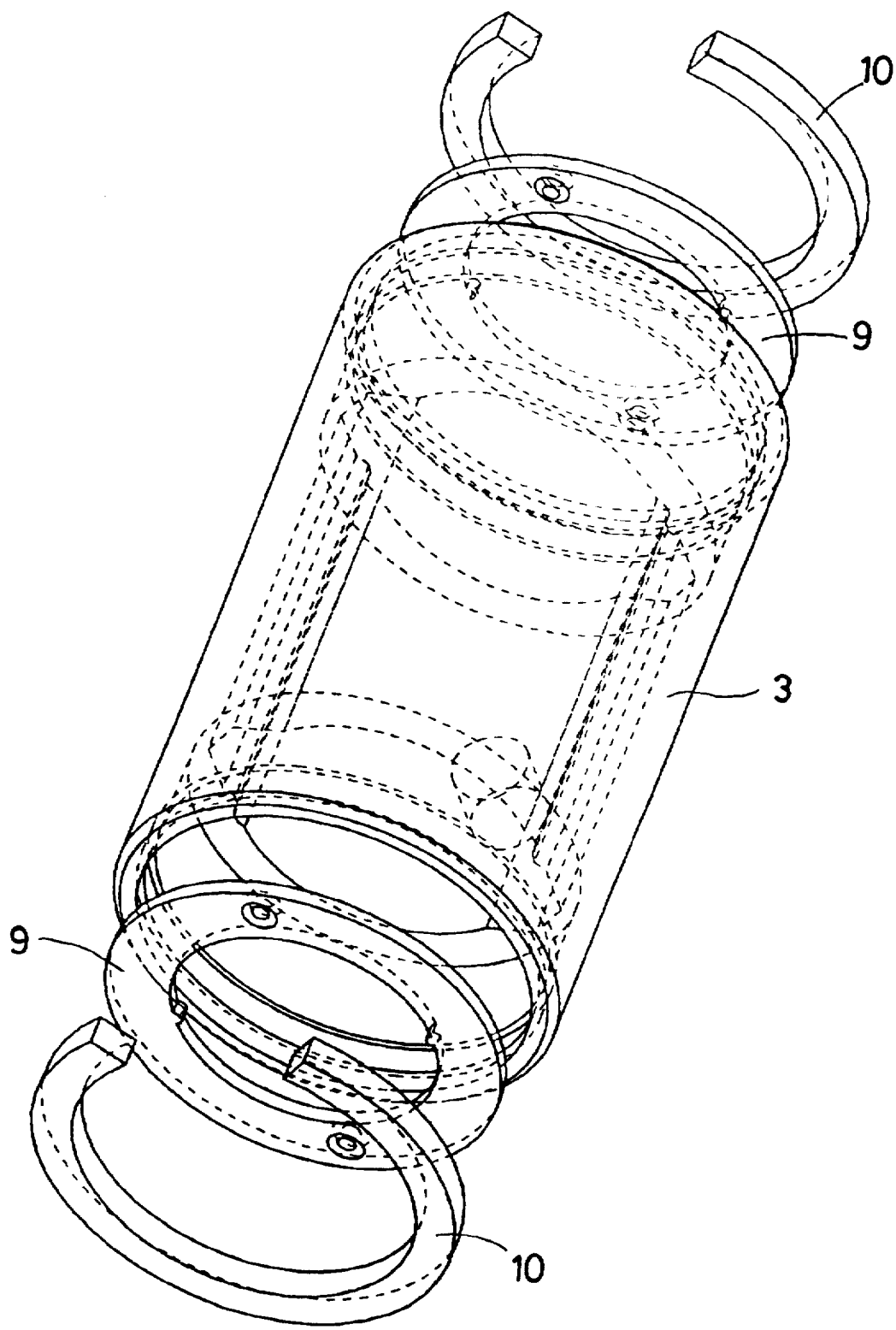
FIG. 2 is a perspective view showing an outer cylinder, end plates and stop rings of the ball spline of FIG. 1.
Figure 3:
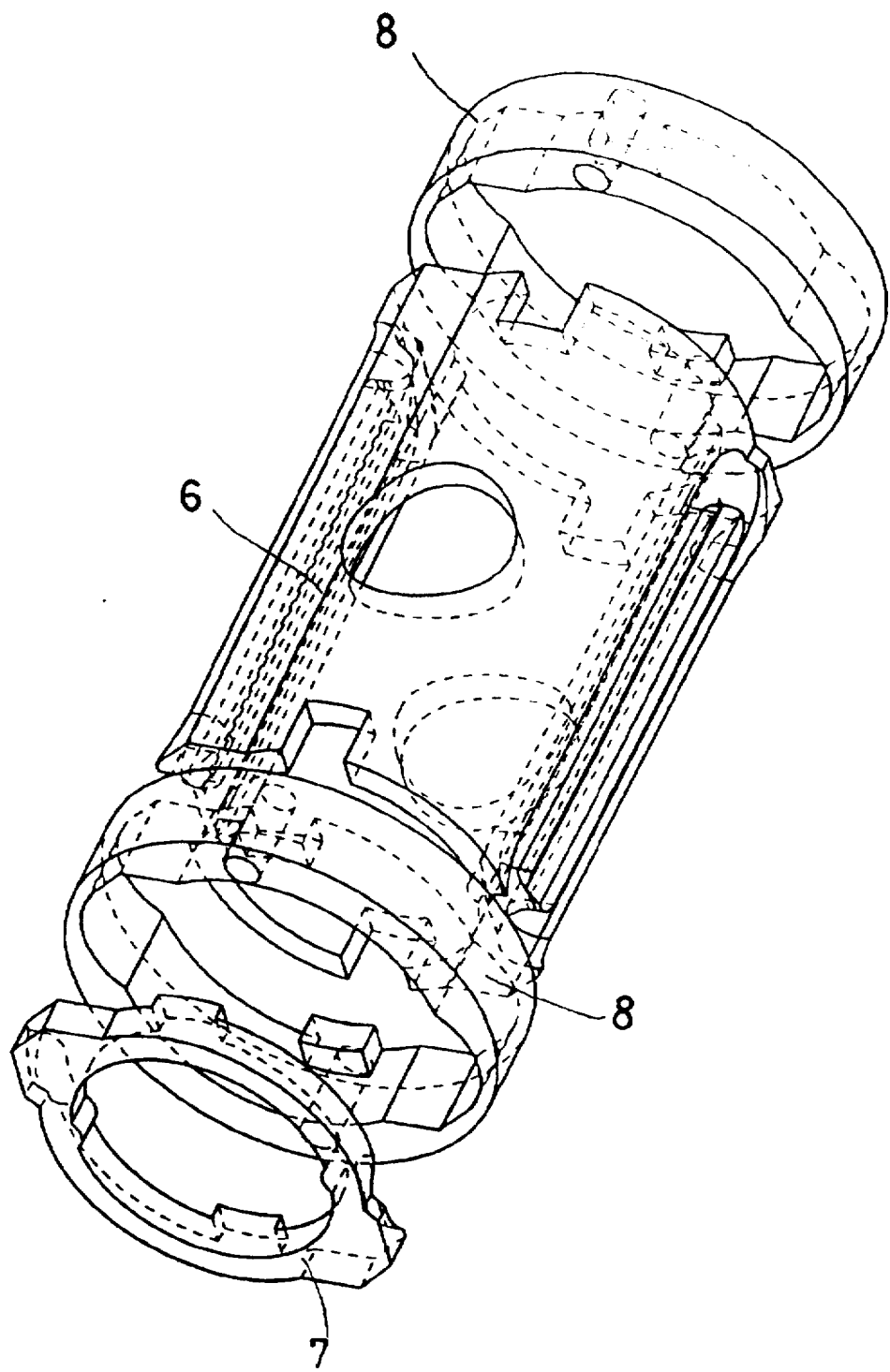
FIG. 3 is a perspective view showing two retainers and rings of the ball spline of FIG. 1.
Figure 4:
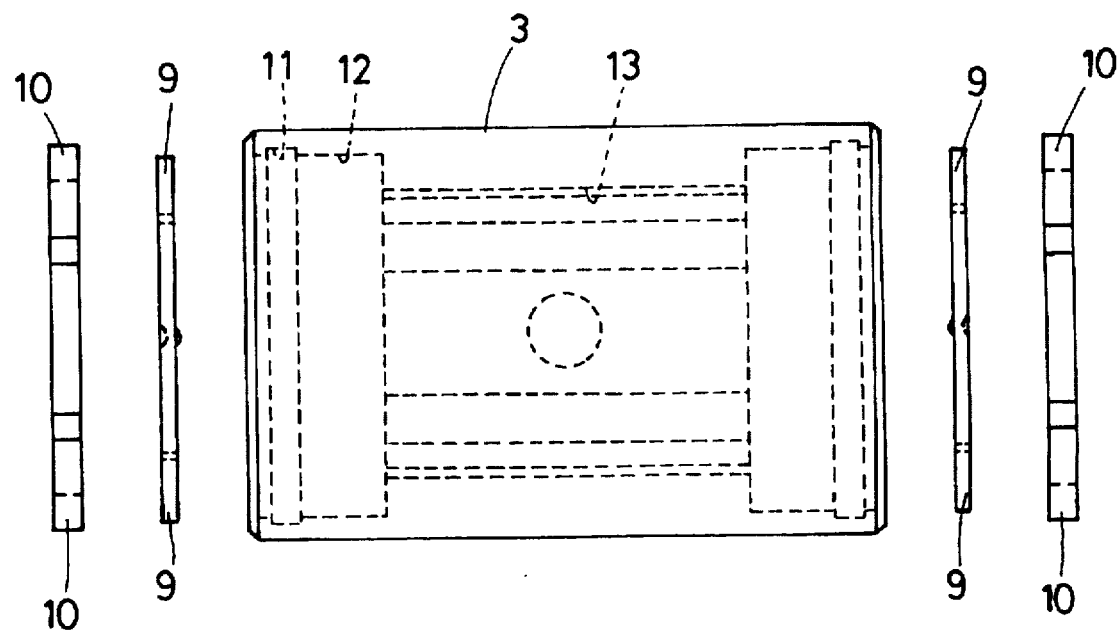
FIG. 4 is an exploded view showing the outer cylinder, end plates and stop rings of the ball spline of FIG. 1.
Figure 5:
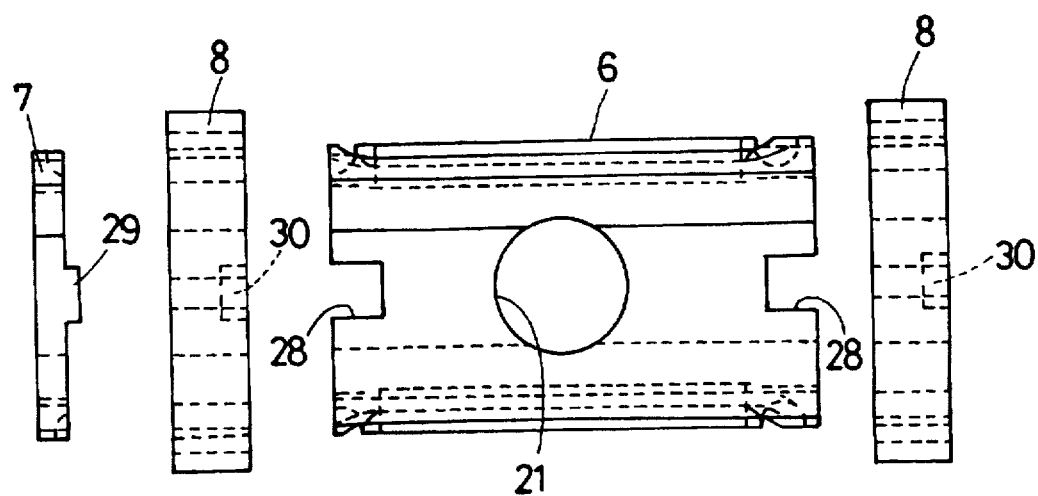
FIG. 5 is an exploded view showing the two retainers and rings of the ball spline of FIG. 1.
Figure 6:
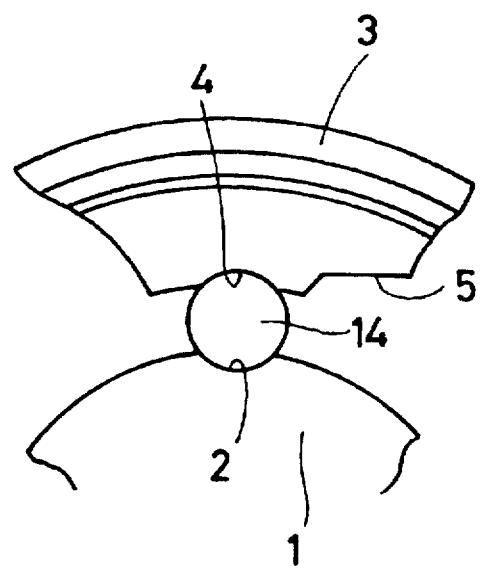
FIG. 6 is an explanatory view showing the relation between the outer cylinder, a ball spline shaft and balls of the ball spline of FIG. 1.

This ball spline can be utilized as a slidable, rotary torque transmissible linear motion guide bearing applied to an industrial robot, a transfer machine and various kinds of manufacturing apparatuses. An embodiment of the ball spline according to the present invention will now be described with reference to FIGS. 1–22.

As shown in FIGS. 1–6, this ball spline comprises mainly an elongated ball spline shaft 1 provided with a pair of raceway grooves 2 (first raceway grooves) in longitudinally extending outer surface thereof, and a slider 20 fitted slidably around the ball spline shaft 1 via a plurality of balls 14 and formed so that rotary torque is transmitted thereto. The slider 20 has characteristics, especially, in the structure of an outer cylinder 3, a structure in which the constituent parts are wholly housed in the outer cylinder 3, and the structures of rings 8 and retainers 6, 7 constituting the constituent parts.

The slider 20 comprises mainly an outer cylinder 3 provided with a pair of raceway grooves 4 (second raceway grooves) opposed to the raceway grooves 2 and formed in longitudinally extending tubular inner surface thereof, and a pair of escape grooves 5 formed so as to be spaced from the raceway grooves 4; a retainer 6 (first retainer) 6 fitted in the outer cylinder 3 and having windows 15; a retainer 7 (second retainer) disposed in contact with the retainer 6 and fitted in the outer cylinder; a plurality of balls constituting rolling elements held by the retainers 6, 7 and rolling in raceways 27 formed by the raceway grooves 2, 4; a pair of rings 8 provided between the outer cylinder 3 and retainers 6, 7 at both end portions of the inside of the outer cylinder 3; a pair of end plates 9 disposed in contact with the rings 8; and a pair of stop rings 10 positioned adjacent to the end plates 9 and fitted in annular grooves 11 formed in both end portions of the outer cylinder 3.

The retainer unit in the present invention is divided into retainers 6, 7 in regions of direction changing passages 18 in which the rolling directions of the balls 14 are changed. The windows 15 formed in the retainer 6 are elongated holes positioned correspondingly to the raceway 27. The balls 14 are adapted to roll with a load received thereon in the raceway 27 between the raceway grooves 2 in the ball spline shaft and those 4 in the outer cylinder 3 with the balls supported on longitudinal edge portions of the elongated holes.

Figure 7:
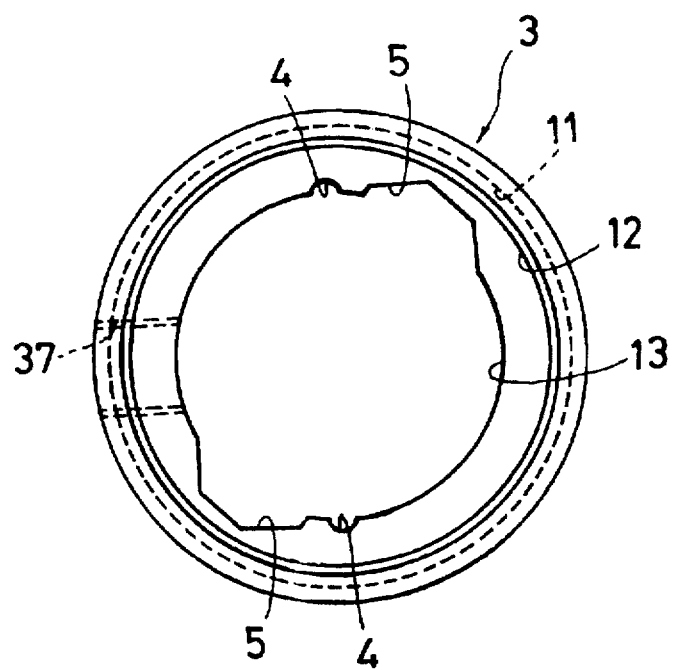
FIG. 7 is a side view showing the outer cylinder of the ball spline of FIG. 1.
Figure 8:
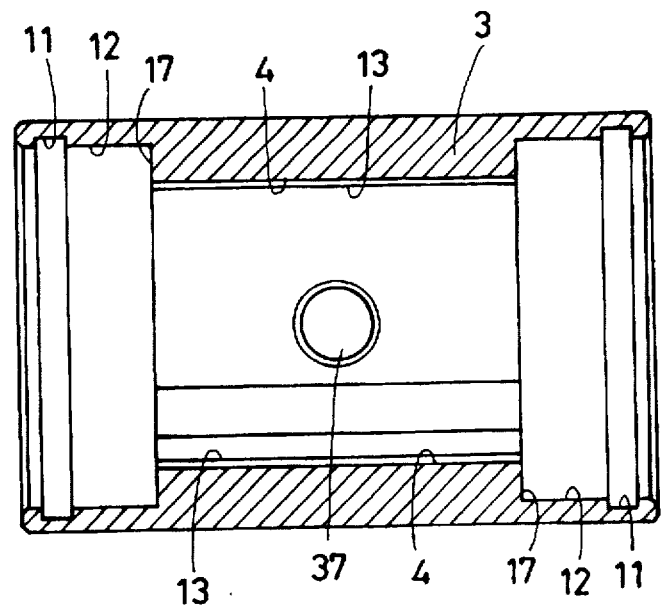
FIG. 8 is a sectional view of the outer cylinder of FIG. 7.
Figure 9:
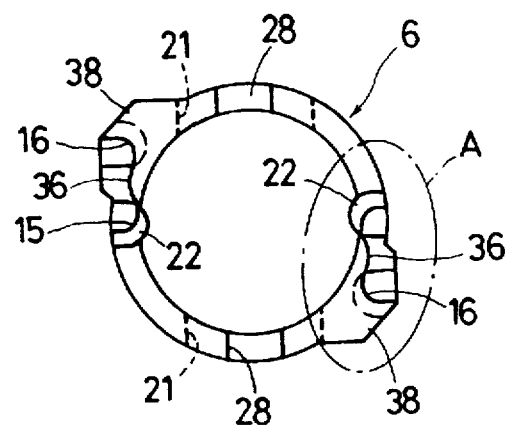
FIG. 9 is a side view of one retainer of the ball spline of FIG. 1.
Figure 10:
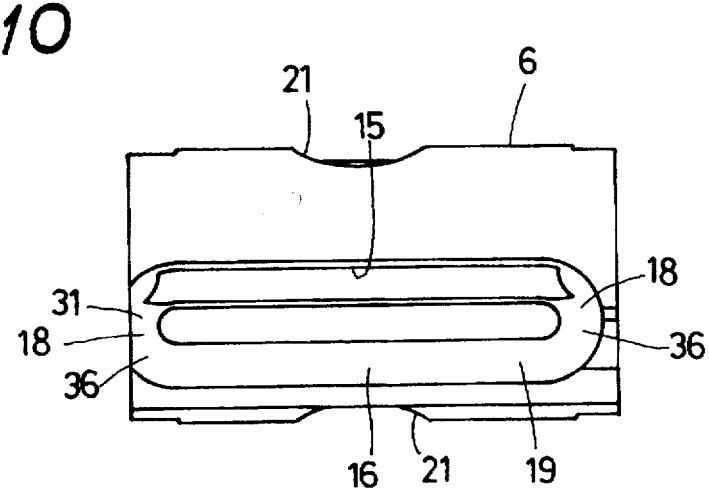
FIG. 10 is a front view of the retainer of FIG. 9.
Figure 11:
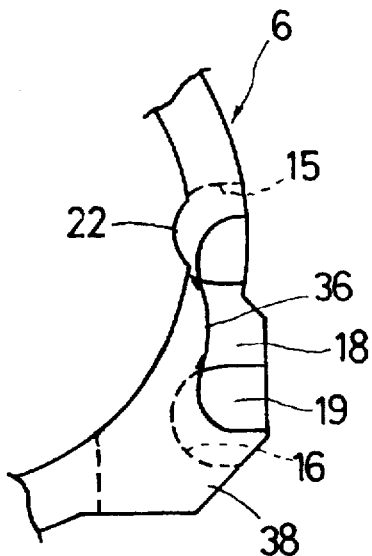
FIG. 11 is an enlarged side view showing a portion of the retainer which is in a region shown by a reference letter A in FIG. 9.

As shown in FIGS. 7 and 8, the outer cylinder 3 is provided with raceway grooves 4, in which the balls 14 receiving a load and transmitting rotary torque to the slider 20 roll, so that the raceway grooves 4 extend longitudinally so as to be opposed to those 2 in the ball spline shaft 1. The raceway grooves 4 in the outer cylinder 3 are formed in a plurality of rows in an inner surface thereof correspondingly to the raceway grooves 2 in the ball spline shaft 1.

The outer cylinder 3 is provided with a plurality of escape grooves 5 forming outer walls of return passages 19 for the balls 14. The outer cylinder 3 has hollows 13 (first hollows) in which the retainers 6, 7 and escape grooves 5 are provided, and hollows 12 (second hollows) formed to a diameter larger than that of the hollow 13 so as to provide stepped portions 17 with which the rings 8 are to be engaged. The outer cylinder 3 is further provided with threaded hole 37 for use in fixing an object to be mounted thereon (not shown) to the outer cylinder 3. The threaded holes 37 formed in the outer cylinder 3 can be made easily as compared with conventional keyways.

As shown in FIGS. 9, 10, 11 and 19, the retainer 6 is provided with windows 15 fitted in the outer cylinder 3 and comprising elongated holes extending longitudinally to a width large enough to prevent the balls 14 from falling therefrom, return grooves 16 forming return passages 19 extending in parallel with the windows 15, and direction changing grooves 36 constituting direction changing passages 36. The retainer 6 is provided at one end portion thereof with the direction changing grooves 36 (first direction changing grooves) which allows communication between the windows 15 and return grooves 16, and at the other end thereof with parts 31 of the direction changing grooves 36 (second direction changing grooves) which allows communication between the windows 15 and return grooves 16. More than one windows 15 are formed (two in the embodiment) so as to extend longitudinally between the raceway grooves 2 in the ball spline shaft 1 and those 4 in the outer cylinder 3. The balls 14 project partially from the windows 15, contact the raceway grooves 2 in the ball spline shaft 1 and roll in the raceways 27, which are formed by the raceway grooves 2, 4, as they receive a load.

The retainer 6 is provided in an outer surface thereof with return grooves 16, which form inner surfaces of the return passages 19 formed so as to be opposed to the escape grooves 5 in the outer cylinder 3, in such a manner that the return grooves 16 extend longitudinally. The retainer 6 is provided with outwardly projecting longitudinally extending projections 38 for forming the return grooves 16. The projections 38 of the retainer 6 are formed so as to be engaged with the escape grooves 5 in the outer cylinder 3. The return grooves 16 and windows 15 formed in the retainer 6 extend longitudinally and in parallel with each other, and the direction changing grooves 36 are formed curvilinearly so as to allow communication between the return grooves 16 and windows 15. The retainer 6 is further provided with through holes 21 in the portions thereof which correspond to the threaded holes 37 formed in the outer cylinder 3.

Figure 12:
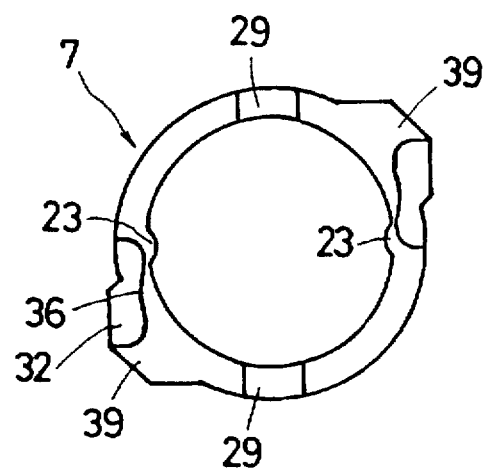
FIG. 12 is a side view showing the other retainer of the ball spline of FIG. 1.
Figure 13:
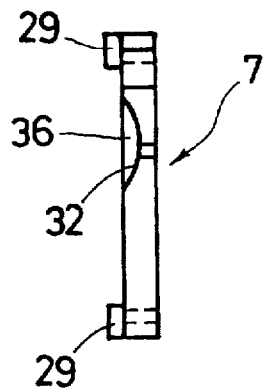
FIG. 13 is a front view of the retainer of FIG. 12.

As shown in FIGS. 12 and 13, the retainer 7 is fitted in a ring 8, and provided with parts 32 (remaining portions of the direction changing grooves 36 (second direction changing grooves)) of the direction changing grooves 36 (second direction changing grooves) which allow communication between the windows 15 and return grooves 16. The retainer 7 is provided with outwardly projecting longitudinally extending projections 39 for forming the direction changing grooves 36. The projections 39 of the retainer 7 are formed so as to be engaged with recesses 24 formed in the ring 8, and they are positioned by being aligned with the projections 38 of the retainer 6.

The retainer 6 is provided at the portions thereof which are on both ends of the windows 15 with inwardly extending curved projections 22 (first projections). The retainer 7 is provided at the portions thereof which are opposed to the raceway grooves 2 in the ball spline shaft 1 with inwardly extending curved projections 23 (second projections). The projections 22, 23 constitute guides for scooping up the balls 14 so as to smoothly roll the balls 14 between the windows 15 and direction changing passages 18. The retainers 6, 7 are provided on their respective contact surfaces with mutually engageable first positioning means.

In this embodiment, the retainer 6 is provided with recesses 28 in end portions thereof, and the retainer 7 projections 29 adapted to be engaged with the recesses 28. The retainers 6, 7 can be formed out of a metal material, and also molded out of a synthetic resin. Accordingly, the retainers can be manufactured easily, and the manufacturing cost can be reduced.

Figure 14:
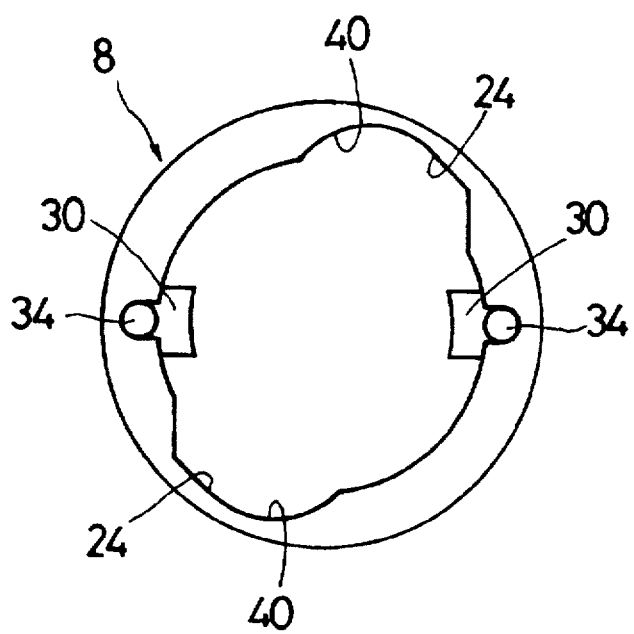
FIG. 14 is a side view showing a ring of the ball spline of FIG. 1.
Figure 15:
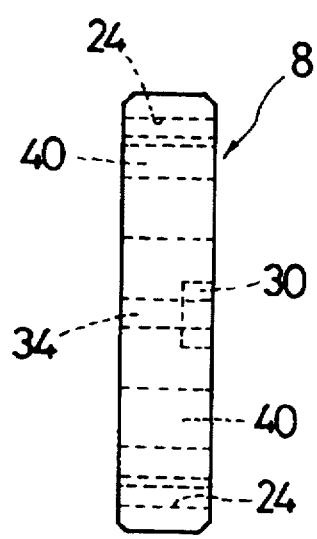
FIG. 15 is a front view of the ring of FIG. 14.

As shown in FIGS. 14 and 15, the rings 8 are fitted in the hollows 12, which are formed in both end portion of the outer cylinder 3, and between the outer cylinder 3 and retainers 6, 7. The rings 8 are positioned in the regions, in which the direction changing passages 18 are formed, and incorporated in the outer cylinder 3. In other words, the rings 8 function in the same manner as the inclined surfaces formed on a conventional outer cylinder which serve as guides for balls.

The rings 8 are disposed in the portions of the outer cylinder 3 which are opposed to the direction changing passages 18 in which the directions of rolling of the balls 14 are changed. Therefore, the outer cylinder 3 may not be provided with such inclined surfaces for changing the directions of rolling of the balls 14 as are provided on a conventional outer cylinder 3. The rings 8 are provided with curved recesses 24 forming outer surfaces of the direction changing passages 18. The projections 38 of the retainer 6 are engaged with the recesses 24, which are provided with curved portions 40, in one ring 8, while the projections 38, 39 of the retainers 6, 7 are engaged with the recesses 24, which are provided with curved portions 40, in the other ring 8. The curved portions 40 of the recesses 24 formed in the rings 8 form the outer surfaces of the direction changing passages 18 when the balls 14 roll from the raceways 27 toward the direction changing passages 18, and enable the balls 14 to be introduced smoothly into the direction changing passages 18.

The engagement surfaces of the retainer 6 and rings 8 are provided with mutually engageable second positioning means. In this embodiment, the second positioning means comprise recesses 28 formed in both end portions of the retainer 6, and inwardly extending projections 30 formed on the rings 8 and engageable with the recesses 28, and the recesses 28 and projections 30 are formed so as to be locked together. The rings 8 can be formed out of a metallic material, and also by molding a synthetic resin material. When a synthetic resin material is used, the rings can be manufactured easily, and the manufacturing cost can be reduced.

The balls 14 are formed so that they roll as they receive a load in the raceways 27 formed by the raceway grooves 2 in the ball spline shaft 1 and those 4 in the outer cylinder 3 via the windows 15. The return passages 19 to which the balls 14 return after they have rolled from one end of each of the raceways 27 to the other ends thereof comprise the return grooves 16 formed in the retainer 6 and the escape grooves 5 in the outer cylinder 3. The direction changing passages 18 for rolling the balls 14 from the raceways 27 to the return passages 19 comprise the direction changing grooves 36 formed in the retainer 6 and the recesses 24 with the curved portions 40 in the rings 8.

Accordingly, the circuit type endless circulating passages in this ball spline in which a plurality of balls 14 can roll circulatingly and endlessly comprise the raceways 27, direction changing passages 18 and return passages 19 (raceways 27→direction changing passages 18→return passages 19→direction changing passages 18→raceways 27). Namely, the balls 14 are adapted to roll circulatingly and endlessly in the raceway constituting load regions, and the direction changing passages 18 and return passages 19 which constitute no-load regions.

Figure 16:
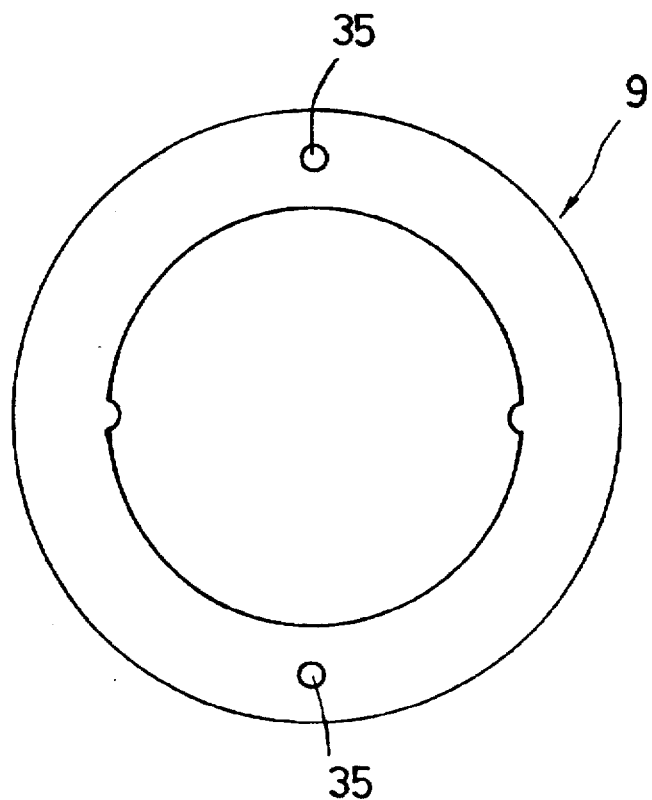
FIG. 16 is a side view showing an end plate of the ball spline of FIG. 1.
Figure 17:
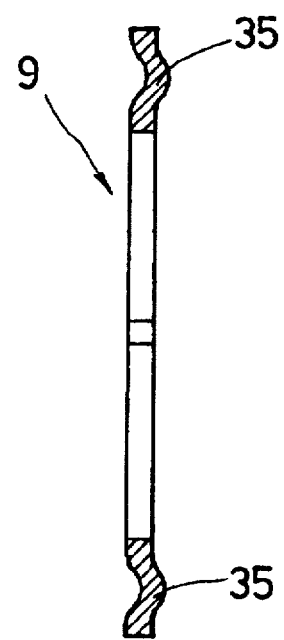
FIG. 17 is a sectional view of the end plate of FIG. 16.

As shown in FIGS. 16 and 17, the end plates 9 are fitted in the outer cylinder 3 and positioned adjacently to the rings 8. The end plates 9 are positioned on the end surfaces of the rings 8 and retainer 6 or 7, and seal clearances between the inner circumferential boundary surfaces of the rings 8 and the outer circumferential surface of the retainer 6 or 7, and function as dust-proof cover.

Figure 21:
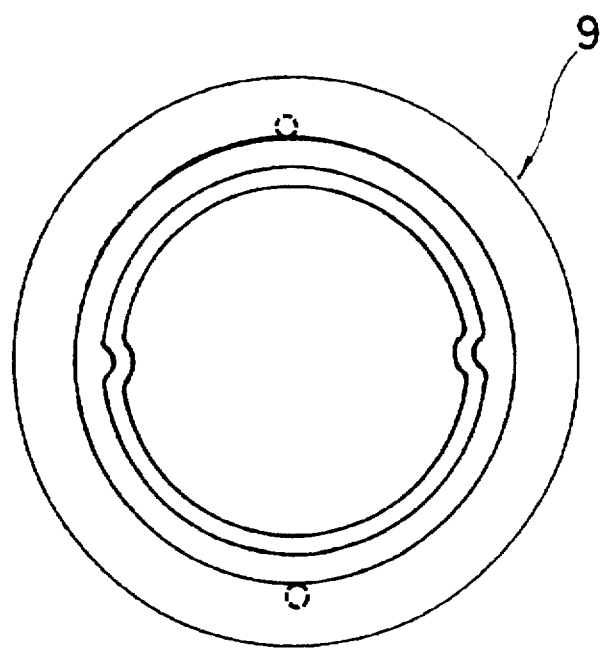
FIG. 21 is a side view showing an end seal, another example of the end plate.
Figure 22:
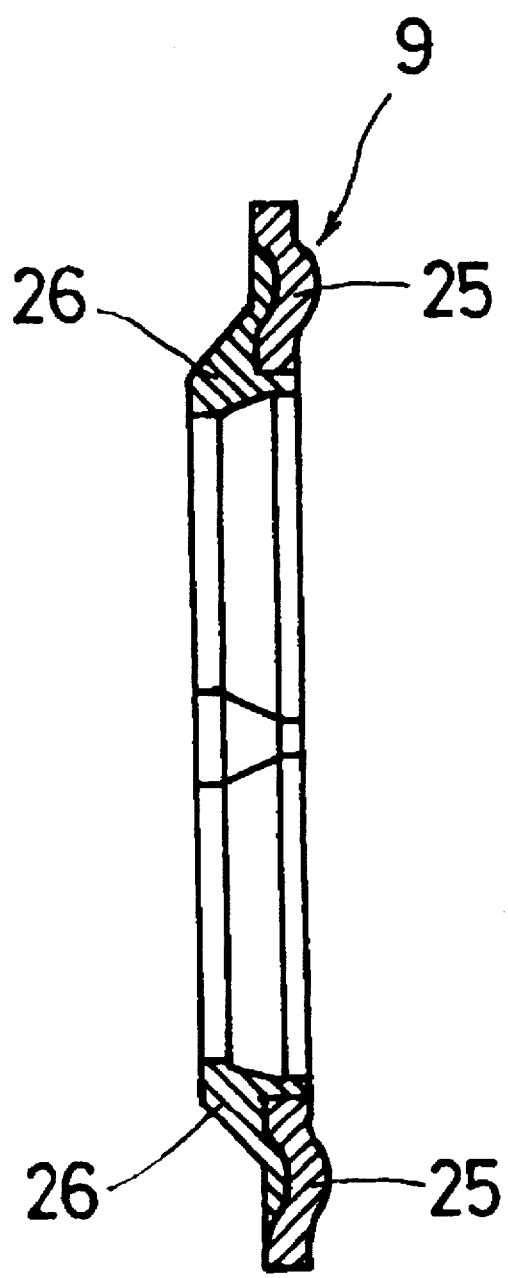
FIG. 22 is a sectional view showing the end seal of FIG. 21.

As shown in FIGS. 21 and 22, the end plates 9 can also be formed as end seals, and by metal cores 25, and seal members 26 fixed to the metal cores 25 and slidingly containing the ball spline shaft 1. The seal members 26 can be formed out of a soft material, for example, rubber and synthetic rubber. The rings 8 and plates 9 are provided with mutually engageable third positioning means.

In this embodiment, the third positioning means comprise through holes 34 made in the portions of the rings 8 which are opposed to the projections 30 thereof, and projections 35 formed on the portions of the end plates 9 which correspond to the through holes 34.

Figure 18:
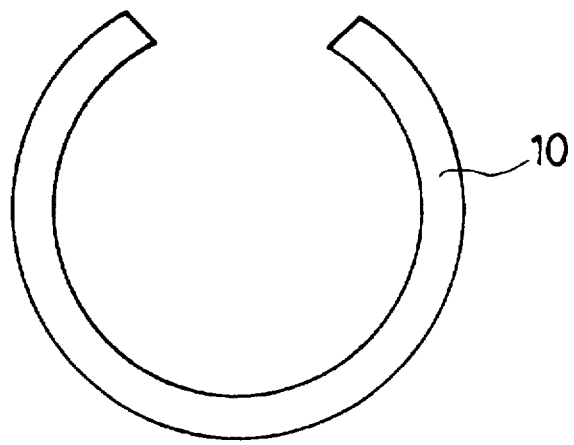
FIG. 18 is a side view showing the released condition of a stop ring of the ball spline of FIG. 1.
Figure 19:
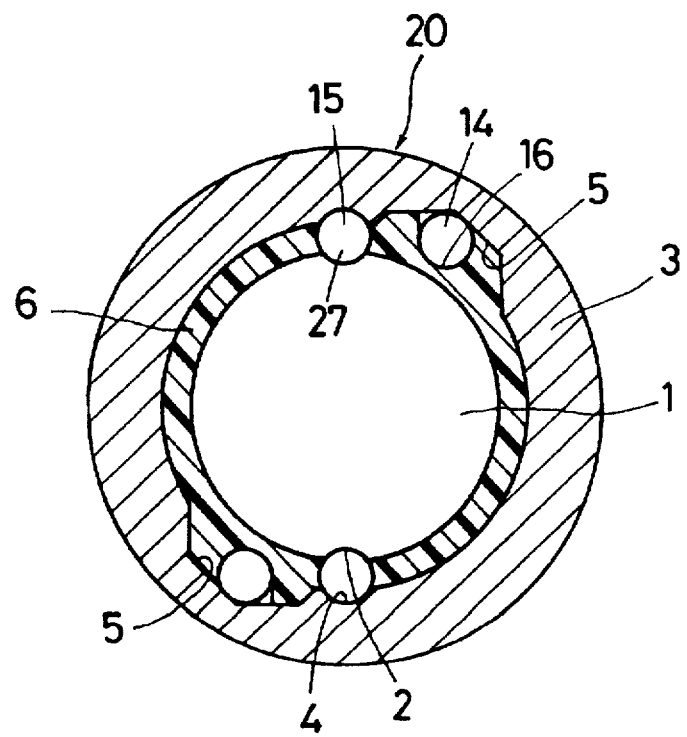
FIG. 19 is an explanatory view showing the relation between the retainer and outer cylinder of the ball spline of FIG. 1.
Figure 20:
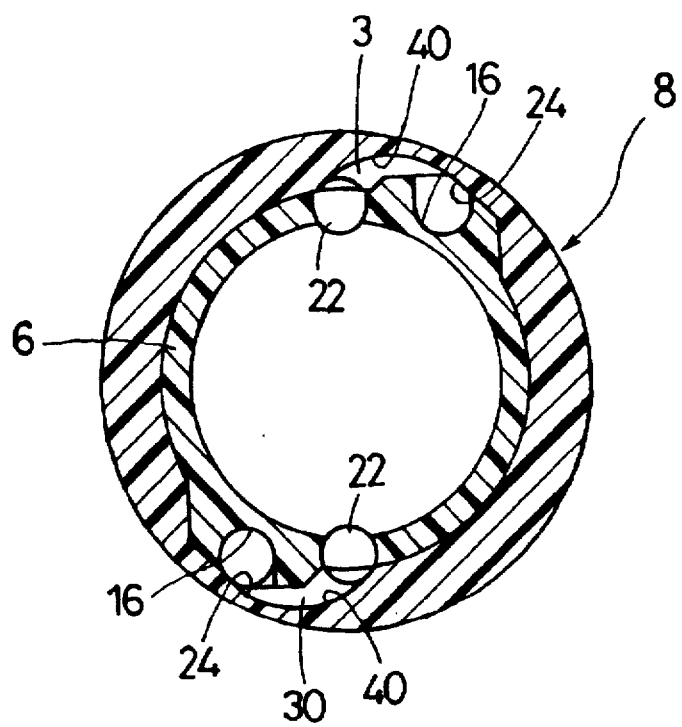
FIG. 20 is an explanatory view showing the relation between the retainer, outer cylinder and ring of the ball spline of FIG. 1.

As shown in FIG. 18, each stop ring 10 comprises a split ring capable of being fitted elastically in the relative annular groove formed in the outer cylinder 3, so as to fix the retainers 6, 7 and relative ring 8 and end plate 9 in the outer cylinder 3.

The constituent parts of this ball spline can be incorporated very easily and reliably into a slider 20, for example, in the following manner. First, the retainer 6 is inserted in the hollow 13 of the outer cylinder 3, and a ring 8 is fitted around the retainer 6 as the ring 8 is fitted in the hollow 12 at one end portion of the outer cylinder 3, the ring 8 and retainer 6 being thereby positioned, an end plate 9 being fitted in a hollow 12 of the outer cylinder 3, a stop ring 10 being fitted in an annular groove 11 at the mentioned end portion of the outer cylinder 3 against the resilient force of the stop ring 10 itself. The other ring 8 is then fitted around the retainer 6 as the ring 8 is fitted in the hollow 12 at the other end of the outer cylinder 3 and positioned with respect to the retainer 6. Since the retainer 6 is separated in the region of the direction changing passage 18 from the retainer 7 as shown, especially, in FIG. 20, the return groove 16 formed in the retainer 6 and the direction changing groove 36 in the divisional plane are formed in an opened state. Therefore, the balls 14 are then inserted in order from the direction changing passages 18 in the divisional plane with the retainer 6 left inserted in the outer cylinder 3, and the retainer 7 is positioned with respect to, brought into contact with and combined with the retainer 6, the other end plate 9 being fitted in the other hollow 12 of the outer cylinder 3, the other stop ring 10 being then fitted in the annular groove 11 at the second-mentioned end of the outer cylinder 3 against the resilient force of the stop ring 10 itself.

What is claimed is:

1. A ball spline comprising a ball spline shaft provided with a pair of first raceway grooves in longitudinally extending outer surface thereof, and a slider fitted around said ball spline shaft so that said slider can be slid on said ball spline shaft, and so that torque can be transmitted to said slider, said slider comprising an outer cylinder provided with second raceway grooves longitudinally extending so as to be opposed to said first raceway grooves, a first retainer fitted in said outer cylinder and provided with windows opposed to said first raceway grooves in said ball spline shaft, and return grooves extending along said windows, a second retainer contacting said first retainer and fitting in said outer cylinder, balls rolling in raceways, which are formed by said first and second raceway grooves, through said windows, rings fitted between said outer cylinder and said first and second retainers so as to form guides for changing the direction of rolling of said balls, end plates fitted in said outer cylinder and disposed adjacently to said rings, and stop rings fitted in annular grooves, which are formed in said outer cylinder, so as to fix said first and second retainers, said rings and said end plates.

2. A ball spline according to claim 1, wherein said outer cylinder is provided with escape grooves forming outer walls of said ball return passages, said return grooves in said first retainer being formed so as to be opposed to said escape grooves and forming inner walls of said return passages.

3. A ball spline according to claim 2, wherein said outer cylinder is provided with first hollows holding said first retainer therein and having said escape grooves, and second hollows having a diameter larger than that of said first hollows so as to form stepped portions around and with which said rings are disposed and engaged.

4. A ball spline according to claim 2, wherein said first retainer is provided at one end thereof with first direction changing grooves forming first direction changing passages allowing communication between said windows and said return grooves, and at the other end thereof with parts of second direction changing grooves forming said second direction changing passages allowing communication between said windows and said return grooves, said second retainer being provided with remaining portions of said second direction changing grooves forming said second direction changing passages allowing communication between said windows and said return grooves.

5. A ball spline according to claim 4, wherein said rings are provided with curved recesses forming outer walls of said direction changing passages.

6. A ball spline according to claim 4, wherein said return grooves and said windows formed in said first retainer extend in parallel in the longitudinal direction thereof, said first and second direction changing passages being formed curvilinearly so as to allow communication between said return grooves and said windows.

7. A ball spline according to claim 4, wherein said balls roll circulatingly in said raceways forming loaded regions, and said first and second direction changing passages and said return passages which form no-load regions.

8. A ball spline according to claim 4, wherein said windows in said first retainer are provided at both ends thereof with first inwardly extending curved projections, said second retainer being provided at the portions thereof which are opposed to said first raceway grooves with second inwardly extending curved projections, said first and second projections forming ball rolling guides between said windows and said direction changing passages.

9. A ball spline according to claim 1, wherein said outer cylinder is provided with threaded holes for use in fixing an object to be mounted thereon to said outer cylinder.

10. A ball spline according to claim 1, wherein contact surfaces of said first and second retainers are provided with first mutually engageable positioning means.

11. A ball spline according to claim 1, wherein the fitting surfaces of said first retainer and said rings are provided with second mutually engageable positioning means.

12. A ball spline according to claim 1, wherein said rings and said end plates are provided with third mutually engageable positioning means.

13. A ball spline according to claim 1, wherein said end plates comprise metal cores, and dust-proofing seal members fixed to said metal cores and slidably contacting said ball spline shaft.

14. A ball spline according to claim 1, wherein said rings and said first and second retainers are formed out of a metal or a synthetic resin material.

* * * * *